(12) United States Patent
McBurney et al.

(10) Patent No.: US 6,430,503 B1
(45) Date of Patent: *Aug. 6, 2002

(54) DISTRIBUTED GPS NAVIGATION SYSTEM

(75) Inventors: Paul W. McBurney, San Francisco; Arthur N. Woo, Cupertino, both of CA (US)

(73) Assignee: Trimble Navigation Ltd., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/003,316

(22) Filed: Jan. 6, 1998

(51) Int. Cl.$^7$ .............................. G01C 21/00; G01S 7/19
(52) U.S. Cl. .................................. 701/213; 342/357.12
(58) Field of Search ................................ 701/207, 213; 342/357.12, 357.09, 357.15

(56) References Cited

U.S. PATENT DOCUMENTS

| | | | | |
|---|---|---|---|---|
| 5,225,842 A | * | 7/1993 | Brown et al. | 342/357.09 |
| 5,345,244 A | | 9/1994 | Gildea et al. | |
| 5,420,592 A | * | 5/1995 | Johnson | 342/357.12 |
| 5,523,761 A | * | 6/1996 | Gildea | 342/357.09 |
| 5,627,548 A | * | 5/1997 | Woo et al. | 342/357.12 |
| 5,793,328 A | * | 8/1998 | Ward et al. | 342/357.09 |
| 5,861,841 A | * | 1/1999 | Gildea et al. | 342/357.12 |
| 5,920,283 A | | 7/1999 | Shaheen et al. | 342/357 |

OTHER PUBLICATIONS

Marshall, Bob, "A Low Cost Two Chip Solution for GPS Sensor Applications", WESCON '97 Conf. Proceedings, Apr. 1997, pp. 2–7.*
Mattos, P. G., "WAAS/EGNOS– Ready 2–Chip GPS Chipset", Satellite Systems for Mobile Communications and Navigation, May 1996, pp. 24–27.*
Frank, G. B. et al, "Collins Next Generation Digital GPS Receiver", IEEE 1990 Position Location and Navigation Symposium, Mar. 1990, pp. 286–292.*

* cited by examiner

Primary Examiner—Gregory C. Issing
(74) Attorney, Agent, or Firm—Blakely Sokoloff Taylor & Zafman LLP

(57) ABSTRACT

A system and method which separates time critical interrupt driven processing of Global Positioning System (GPS) signals from non-time critical processing. A measurement platform performs all satellite tracking functions which are driven by interrupts. Intermediate measurements data generated therefrom, for example code phase, carrier phase and Doppler, are communicated to a user platform which computes receiver position and time. As a result, the user platform can easily be configured to perform user-specific processes without incurring conflicts with the interrupt driven processes occurring on the measurement platform.

58 Claims, 6 Drawing Sheets

DISTRIBUTED GPS NAVIGATION SYSTEM

BACKGROUND OF THE INVENTION

1. Field of the Invention

The system and method of the present invention relates to the computation of positions and timing using positioning data received from a global positioning system (GPS).

2. Art Background

The global positioning system has become increasingly popular as a position determination or time determination mechanism for a variety of applications. Using data received from GPS satellites, a receiving device can compute the position of the receiver and the current time. In early systems, a GPS receiver included a processor executing specially coded software to perform the measurements and compute navigation solutions (e.g., receiver position and time). The navigation solutions would then be transmitted to a user's processing system which would then generate application solutions, e.g., determining distance moved since last measurement. Alternately, the GPS receiver manufacturers would customize receivers to perform processes to generate navigation solutions as well as the user application solutions.

With the ever-increasing processing power of microprocessors and the desire to reduce cost and overall power consumption, there has been a move to eliminate the processor in the receiver and have the user's processor perform the navigation solution processing and the user application solution processing. Although a single microprocessor is capable of providing sufficient processing power and one processor consumes less power than two processors, integrating such functionality is not a simple task. First, processes performed to track satellites and processes performed to search for and acquire preliminary measurements are time critical; that is, as the positioning data is received from the satellites, the tracking calculations must be performed in order to maintain a closed tracking loop. Furthermore, certain preliminary measurement solutions must be performed within a certain window in order to timely process current data.

In order to manage the time critical nature of the processes, the processor that performs the tracking and measurement solutions calculations must manage a continuous stream of interrupts, i.e., the processor is interrupt driven. For example, interrupts are generated when the data is available in the correlators of the receiver, typically every millisecond for each GPS channel. Other processing, including the user application solution processing, may therefore be delayed significantly as the high priority interrupts take precedent. Furthermore, the situation can be particularly problematic if the application solution processing requires uninterrupted periods of time. In such a situation, the time critical interrupts may not be serviced in a timely manner resulting in failure to track satellites or in unreliable data being generated.

Furthermore, due to the above constraints, the end user is typically incapable of programming the end user application without corrupting the basic GPS algorithms or data generated therefrom. Thus, the GPS manufacturer's specially trained programmers typically have to program the end user application.

SUMMARY OF THE INVENTION

The system and method of the present invention provides a cost effective and efficient technique for performing time critical tracking and measurement calculations for processing Global Positioning System (GPS) signals without conflicting with other time critical tasks in the user's application. Furthermore, the system takes advantage of the processing power of the user system for executing non-time-critical GPS processing in the user's system. In addition, low power operation is achieved using a dual component system. Finally, the dual component system enables the end user to program custom applications incorporating Global Positioning System (GPS) technology.

In one embodiment the receiver is coupled to a channel unit which receives correlation energy data for each channel output from the correlators. The output from the correlators requires time critical processing to control the tracking loops for each of the channels in order to maximize the correlation energy and to generate intermediate measurement data. In one embodiment, the intermediate measurement data includes the carrier phase, code phase and Doppler data.

The system localizes processing which is common to many GPS solutions and partitions between tracking and position/velocity/time (PVT) data not only to separate the time critical processing portion but also to generate a low power component that is capable of being used for many different types of GPS solutions and applications.

The intermediate measurement data is transmitted to a processor, such as a user's general purpose processor, that computes non-time-critical processes of the navigation solution, for example, receiver position, velocity and time. The user processor therefore is easily configurable to compute user application solutions. As the navigation solution processes are non-time critical, processing conflicts with the user application are minimal. In addition, the processing power of the user's processor is taken advantage of, thereby minimizing costs, while providing a workable system that lends itself easily to user customization.

In one embodiment, the channel unit is configured with on-chip memory. The memory contains the code needed to operate the channel unit and also functions as an intermediate storage area. Any address lines between the channel unit and processor are eliminated; furthermore, the number of data lines are reduced. In one embodiment, the number of data lines are reduced to support a standard serial or parallel link. As the number of lines are reduced significantly, so are the number of drivers and the power needed to operate the drivers. Therefore significant power savings are achieved at the channel unit.

BRIEF DESCRIPTION OF THE DRAWINGS

The objects, features and advantages of the present invention will be apparent to one skilled in the art from the following detailed description in which.

DETAILED DESCRIPTION

In the following description for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1:
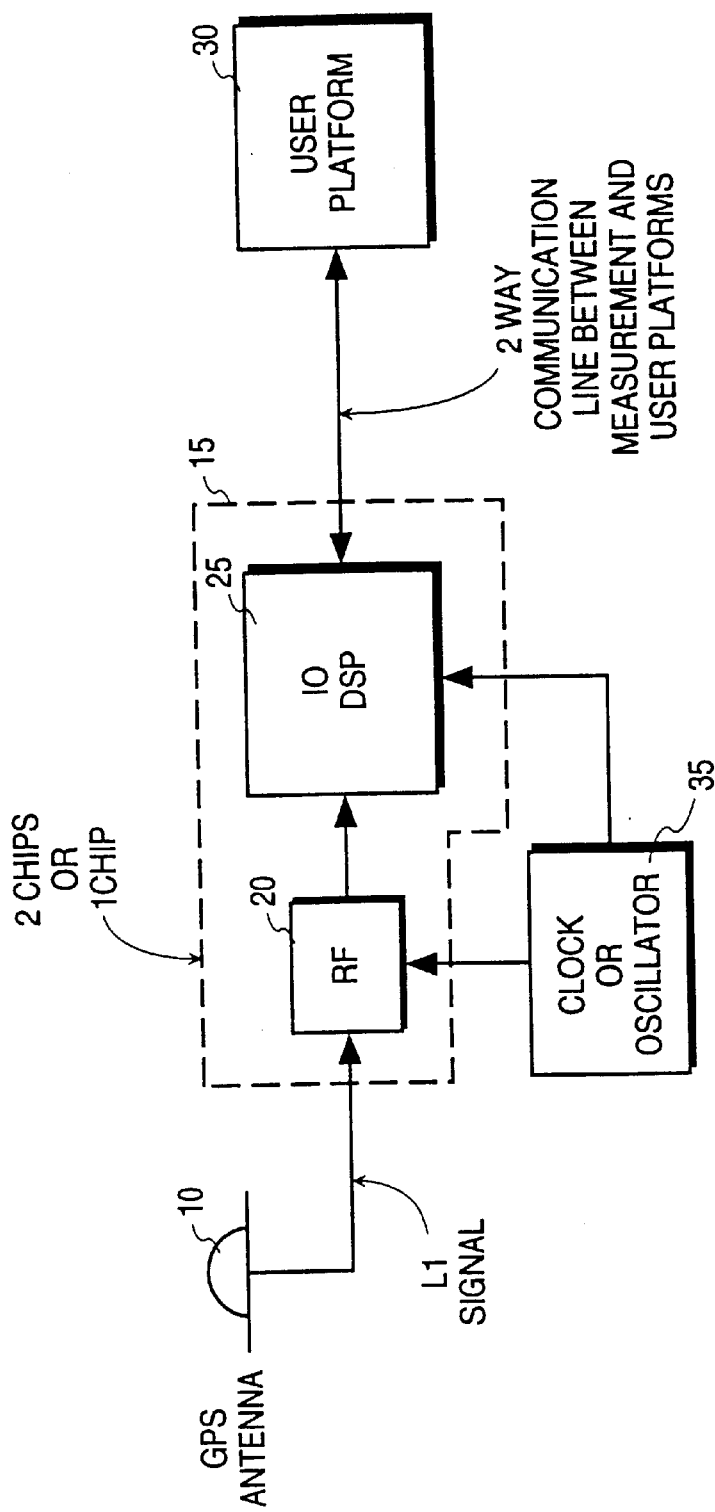
FIG. 1 is a simplified block diagram of the system of the present invention.

A simplified block diagram of one embodiment of the system of the present invention is shown in FIG. 1. The embodiment described receives positioning signals from the Global Positioning System (GPS). However, it is contemplated that the present invention can be configured to receive positioning signals from other satellite and terrestrial positioning systems, for example, satellite-based GLONASS and terrestrial-based pseudo-lite systems.

Referring to FIG. 1, the system can be divided into 2 platforms: a measurement platform 15 and a user platform 30. The measurement platform 15 receives raw positioning signals, e.g., the L1 signal, for input maintenance 10 to the RF downconverter 20 which generates the in-phase (I) and quadrature (Q) signals for each channel corresponding to a satellite the measurement platform is to lock to and track. The in-phase and quadrature signals are input to a channel unit subsystem 25 which performs the time critical calculations to enable the receiver to lock to and track each satellite in view. Intermediate measurement data generated by the channel unit subsequently is transferred to the user platform which generates the navigation solutions and also, in one embodiment, generates application specific data from the navigation solutions. Such intermediate measurement data may also include the pseudo-range to each satellite and the navigation message from each satellite being tracked. Other relevant data include Doppler offsets and carrier phase.

The advantages to such a system are quite evident. By isolating the time critical GPS processing of the measurement platform from the non-time critical processing performed on the user platform, the flexibility required by users of GPS technology is easily achieved. For example, the user platform can easily be implemented on a user's general purpose processor which is connected to the measurement platform through a standard parallel or serial connection. The processing power of the user processor can be sized to the user's application; under utilization of the processor or the need to connect an additional processor to handle some or all of the application processing is avoided. As all time critical processing is performed on the measurement platform, any user-added application processes can be executed in conjunction with the navigation solution processes without conflict. Furthermore, the navigation solutions do not have to be coded to address time critical functions which typically are a function of the hardware used; instead the navigation solutions can be coded in a general way that lends itself to porting across a variety of hardware and operating system platforms.

The system localizes processing which is common to many GPS solutions and partitions between tracking and position/velocity/time (PVT) to separate not only the time critical processing portion but also to generate a low power platform that is capable of being used for many different types of GPS solutions and applications. As will be described below, low power operation is achieved by eliminating a large percentage of I/O drivers typically implemented in prior art GPS components. The variety of applications that can utilize the present invention is almost limitless.

Figure 2:
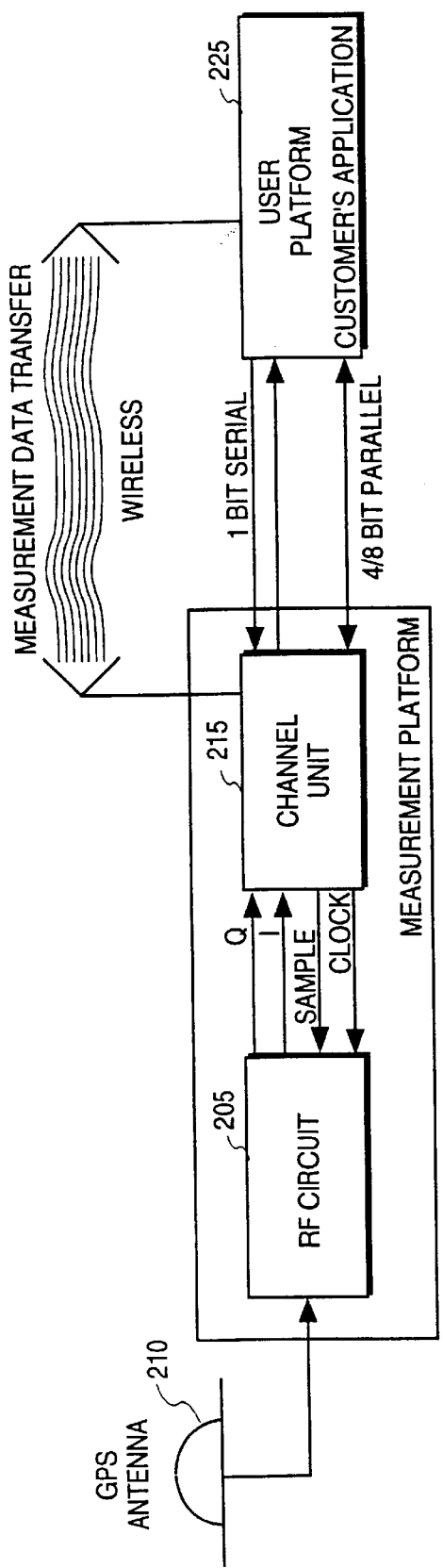
FIG. 2 is a simplified block diagram of one embodiment of the present invention showing different communication techniques between platforms.

As shown in the simplified block diagram of FIG. 2, the RF downconverter 205 receives GPS signals from the one or more satellites via the GPS antenna 210. For each satellite signal received, the I, Q and clock signals are transmitted to the channel control subsystem 215. The channel control sub-system 215 processes the signal in a timely manner and transmits the intermediate measurement data to the user platform 225. The intermediate position data can be transmitted a variety of ways as the time-critical nature of the data has been eliminated by confining the time critical processing to the measurement platform. The intermediate measurement data can be conveyed to the user platform a variety of ways, including by a serial link, parallel link or wireless communication link.

Figure 3:
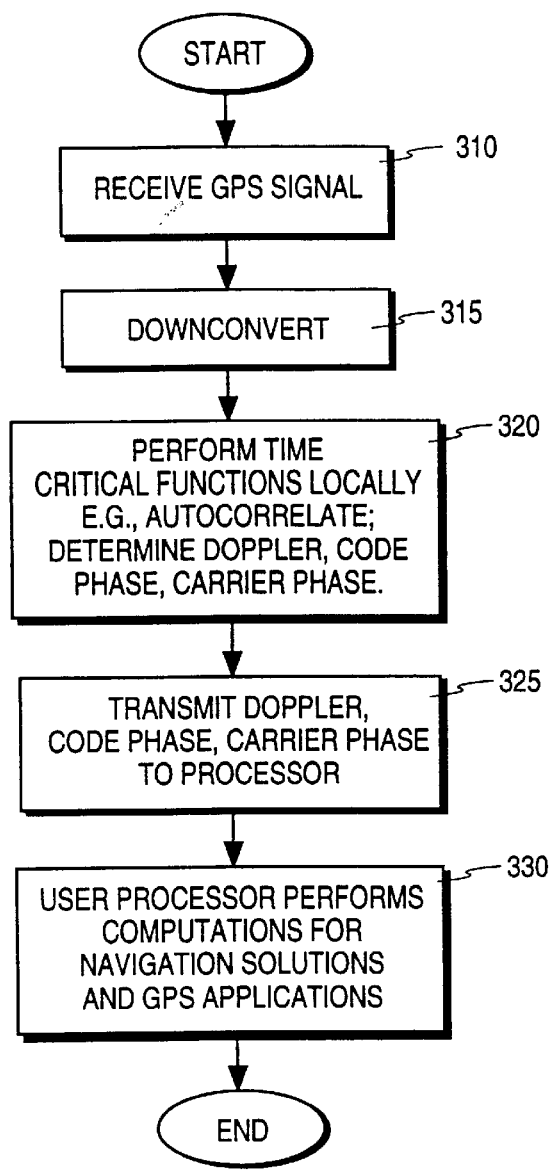
FIG. 3 is a flow chart illustrating one embodiment of the process of the present invention.

The process is generally described with reference to FIG. 3. At step 310 GPS signals are received on the measurement platform. At step 315, the signals are downconverted and processed, step 320, to perform the time critical functions required to lock and track to each satellite in view of the antenna. Intermediate measurement data is generated during this process, e.g., Doppler, code phase and carrier phase, and is transmitted to the navigation platform, step 325. At step 330, the user platform performs the computations necessary to generate the navigation solutions and information pursuant to user specific applications. For example, the user platform picks the satellite tracking set, calculates prepositions for satellites and sends preposition data to the channel unit, filters raw measurement data received, manages setting millisecond time, formats 50 bps Navigation data received, computes PVT and controls the measurement platform for power management purposes. In one embodiment, the measurement platform has sufficient logic to search for all satellites and preposition for satellites using only previous measurement data for observed satellites or a default search parameter set. In this situation, satellite preposition information does not need to come from the user platform.

Figure 4A:
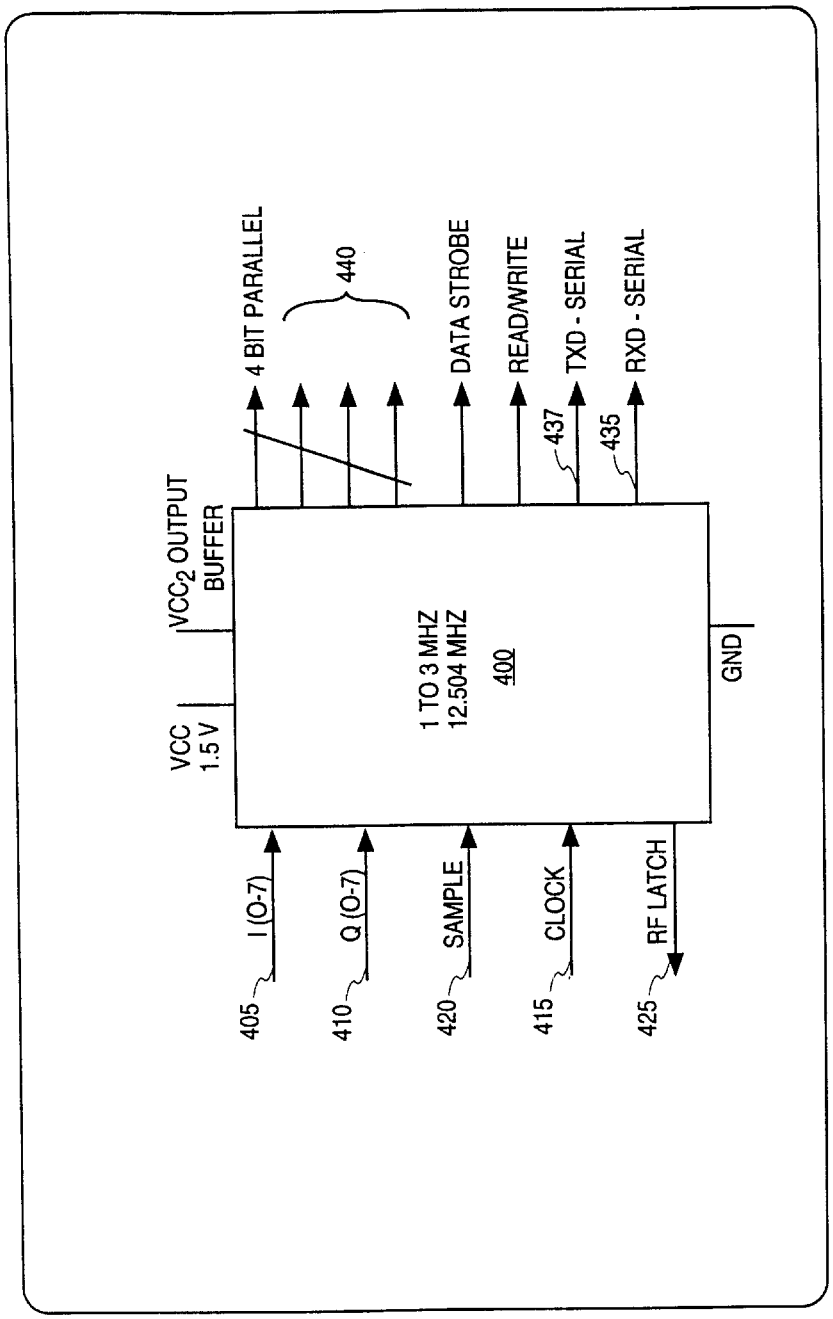
FIG. 4a is a block diagram of one embodiment of the measurement platform of the system of the present invention.

It is readily apparent that the measurement platform and the user platform can be implemented a variety of ways and the present invention is not limited to the embodiments described herein. In one embodiment of the system of the present invention, the receiver platform includes circuitry sufficient to track multiple satellites. The platform includes an RF downconverter circuit, such as the those available from Trimble Navigation Limited, connected to a channel unit sub-system, preferably implemented herein as a single-component digital signal processor specially configured to perform the functions described herein. As shown in FIG. 4a, the component 400 receives as input the in-phase 405 and quadrature 440 signals for each satellite in view (in the present illustration, up to 8 satellites, but it could be as many as 12). A clock signal 415, sample trigger 420 and a signal to control the power to the RF downconverter 425 also are coupled to the RF downconverter. The component 400 is further connected via a data port to a processor (not shown) to perform the navigation solution processing and user application processing. In the present embodiment, the component 400 is configured to selectively provide the intermediate measurement data via a serial link 435, 437, or parallel link 440. In addition, it is contemplated that the component 440 could be coupled to communication circuitry (not shown) that provides a wireless connection to the user platform. Also, different frequency downconversion techniques would allow the in-phase and quadrature signals to be generated on the channel unit from a single source on the RF circuit which have been partially downconverted.

The tracking information with respect to each satellite is associated with a particular channel. As noted above, in order to maintain a lock on each satellite, the tracking circuitry and processes must be immediately responsive to the incoming satellite data. The tracking is done principally by code delay locked loops (DLLs) and carrier phase lock loops (PLLs). These can be embodied as hardware, software or a combination of both. The DLL and PLL assure that the incoming codes and carrier phases received for each satellite are matched (locked) to the receiver generated codes and phases, and remain locked throughout the tracking of the continuously received signals.

In the GPS system, with respect to each satellite in view, the information to be transmitted by the satellite is modulated by a pseudo-random code to generate a pseudo-random signal that is transmitted by the satellite and received at the receiver. Matching pseudo-random codes are also generated at the receiver by code generators. Correlators, at least one for each channel, are used to match the pseudo-random code received from the satellite with the pseudo-random code generated at the receiver. In a DLL implementation, two correlators are typically used to measure the time shift of the received code with respect to the receiver generated code. A numerically controlled oscillator (code NCO generator) generates the phase and frequency of the receiver codes (e.g., C/A code or P-Code). This signal is selectively delayed to generate three phases of the code: early, punctual and late. The received signal is correlated with all three. The output of the late correlator is subtracted from that of the early correlator, thus forming an error function that is used to drive the code NCO, which advances or retards the code in a manner to lock to the received signal and to track the satellite. These techniques are well-known and well-defined in the GPS literature.

The punctual code corresponds to the phase of the received signal. The correlation between the punctual and incoming codes is used to control the carrier tracking loop and to recover the navigation message transmitted. The carrier PLL functions similarly to the DLL. In particular, a second carrier NCO produces an output signal that drives the receiver frequency so that the sampling frequency to do final mix-down (downconversion) is matched in phase with the receive frequency. A phase comparator generates an output value that is proportional to the difference in phase between the incoming carrier phase and the receiver carrier phase.

As the satellites are tracked, the intermediate measurement data code phase, carrier phase and Doppler is generated and output to the user platform in a non-time critical manner. Code phase data is an average or a snapshot of the data shifted from a time reference to track the incoming code. Doppler data is an average or a snapshot of the carrier NCO signal required to track the incoming carrier signal. Carrier phase data is an average or a snapshot of the phase of the carrier NCO signal or the time delta between the carrier I and Q clock and a time reference. As mentioned above, these snapshots or averages are computed from time critical data, but can be output in a non-time critical manner. The processes that generate the code phase, carrier phase and Doppler data are known to those skilled in the art and will not be described further herein.

Figure 4B:
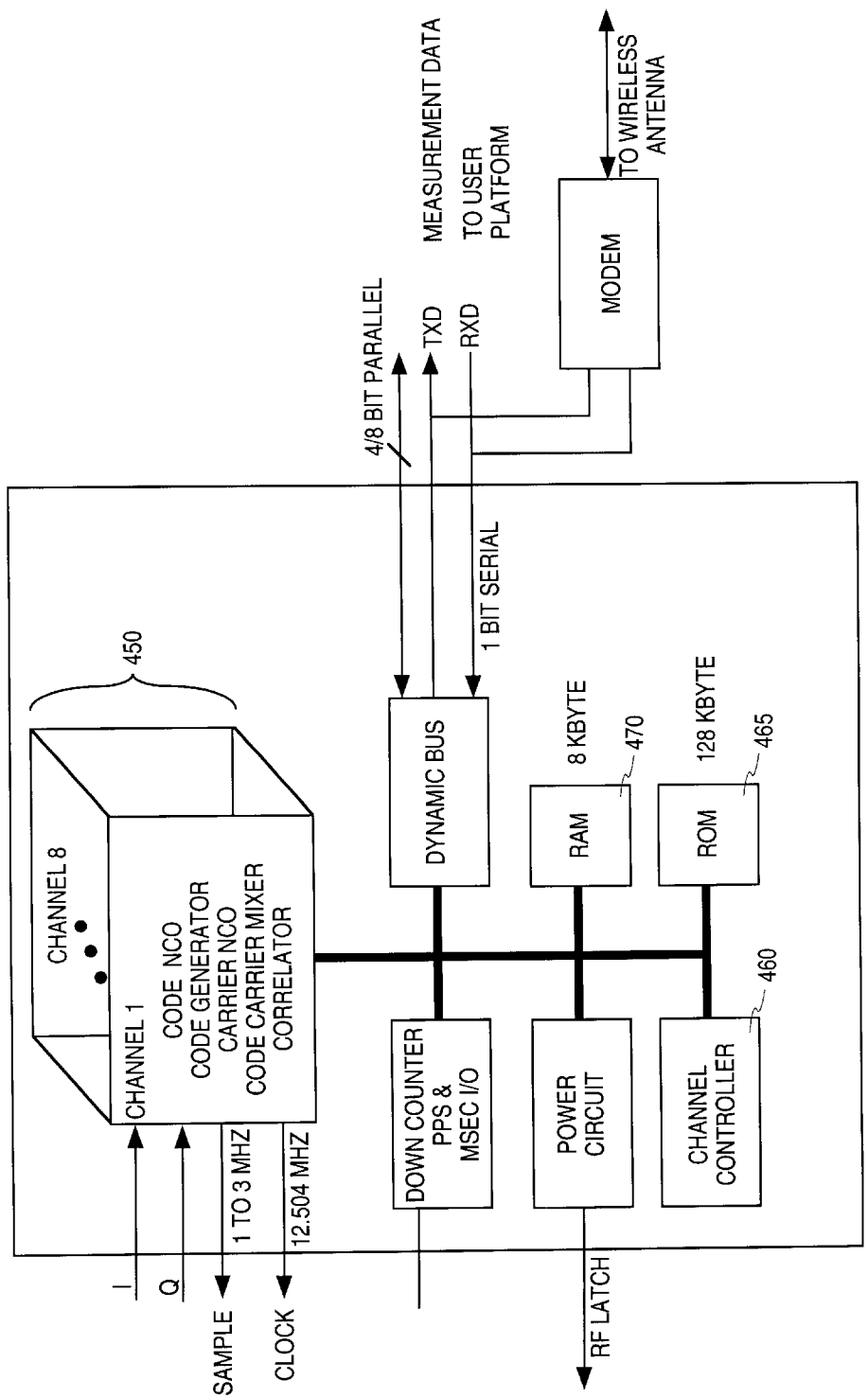
FIG. 4b illustrates one embodiment of a digital signal processor incorporating in the teachings of the present invention.

An illustrative block diagram of the channel unit subsystem is illustrated in FIG. 4b. In this embodiment, the DLLs and PLLs (generally shown as 450) for each channel are digitally implemented and are controlled by the channel unit 460. The channel unit 460 maintains the code NCO phase and carrier NCO phase outputs synchronous with the incoming signals received from the satellites.

Preferably the channel unit 460 is implemented as a microprocessor with sufficient processing bandwidth to execute the locking and tracking and formatting functions. It is contemplated that the channel unit can be implemented in alternate ways, including in hardware, wired logic or dedicated microcontrollers or state machines. Also, the number of channels can vary depending on how they are controlled by the user platform (e.g., sequenced all on one channel or use dedicated channels).

In one embodiment, the channel unit performs the following functions:

all interrupt driven processing such as processing correlator outputs which recur nominally every millisecond per channel millisecond interrupt processing update of master timers update of carrier phase process input/output messages to provide slew rate control of the satellite searching, acquisition, allocation and usage per channel buffer the intermediate measurements of strobe measurements update search for satellites loop closure Preferably each channel is idle until a prepositioning command is received from the user platform and a search for the satellite is started and continued based on the prepositioning information, expanding the search window as needed based on expected signal dynamics. If no prepositioning command is received, the measurement platform will preposition using a prior measurement locally maintained.

The channel unit sub-system further includes memory. In this embodiment, read only memory 465 is used to store instructions executed by the channel unit 460 to perform the locking and tracking functions. Random access memory 470 is also included to temporarily store the intermediate measurement data generated; therefore, there is no time critical requirement to send the data to the user platform and intermediate measurement data can be transmitted at a rate slower than the rate generated. Furthermore, by including the memory on the measurement platform and connecting the channel unit directly to the channels there is no need to directly address the multiplicity of GPS channel hardware such as code NCO, carrier NCO and channel correlation circuitry. Furthermore, there is no need to provide for memory addressing to off-platform memory; therefore the pin count of the component is decreased substantially and the addressing is simplified and the power consumption is decreased by elimination of a large number of I/O drivers.

A dynamic bus interface 475 is also included. This enables the channel unit subsystem to be configured for a variety of outputs such as a serial connection (e.g., RS-232 or RS-422) and a parallel connection connection. In addition, it is contemplated that the channel unit subsystem can be coupled to external communication circuitry, such as the wireless communication circuitry 480 shown, to convey the intermediate measurement data across a variety of media and processing platforms. As a straightforward general purpose connection can be configured between the measurement platform and the user platform, extreme flexibility is achieved. For example, as the transmission and reception of data is not time critical and to protect the communication protocol and data contents, the data can be encrypted prior to transmission and/or reception.

As noted above, the measurement platform can communicate with the user platform via a variety of types of connections including well known serial and parallel connections. In the embodiment shown in FIG. 5, the user platform 500 includes a dynamic bus interface 505, microprocessor 510, clock circuitry 515, RAM 520, ROM 525, and UART 530 (universal asynchronous receiver transmitter) also included in the present embodiment 500 is a battery back up controller 535 and a connection to a wireless communication circuit 540.

The dynamic bus interface 505 interacts with the bus interface on the measurement platform and with UART 530 to receive the intermediate measurement data for additional processing. Preferably the bus interface 505 functions in a bi-directional manner to communicate information back to the measurement platform. For example, in the present embodiment, it is desirable to transmit preposition data to the measurement platform to give the measurement platform initial information regarding where to look for satellites. This capability is optional and in the absence of such preposition data from the user platform, the measurement platform can use logic to search for satellites in accordance with algorithms provided by GPS specifications.

The microprocessor 510, RAM 520 and ROM 525 can be embodied as a general purpose microprocessor and memory or a specially configured processor system. As the navigation solutions processed are non-time critical, the software developed to execute the processes can be designed more for porting across a variety of hardware and operating system (OS) platforms and not for time critical processing which is typically OS and hardware specific. Thus, it is envisioned that the navigation solution processes are embodied as software routines that are easily ported across a variety of platforms. As the nature of the routines are not time critical, the routines can easily be executed in a multitask environment along with the user's application processes. Furthermore, the user can develop application processes without the need to have intimate knowledge of the GPS-specific processes, as the processes can typically execute concurrently without significant conflict.

The realtime clock is used to establish an estimate of time accurate to a few minutes for selection of "visible" satellites. In addition, it is preferred that the user platform includes a controller 535 to control a battery backup (not shown) in case of loss of power. The UART 530 is preferably configured to communicate to the measurement platform via the dynamic bus 505 and further to communicate with other coupled devices. For example, differential GPS correction data (in the RTCM format) is received via the UART 530 and the UART 530 is used to output information acquired and processed to other devices.

Figure 5:
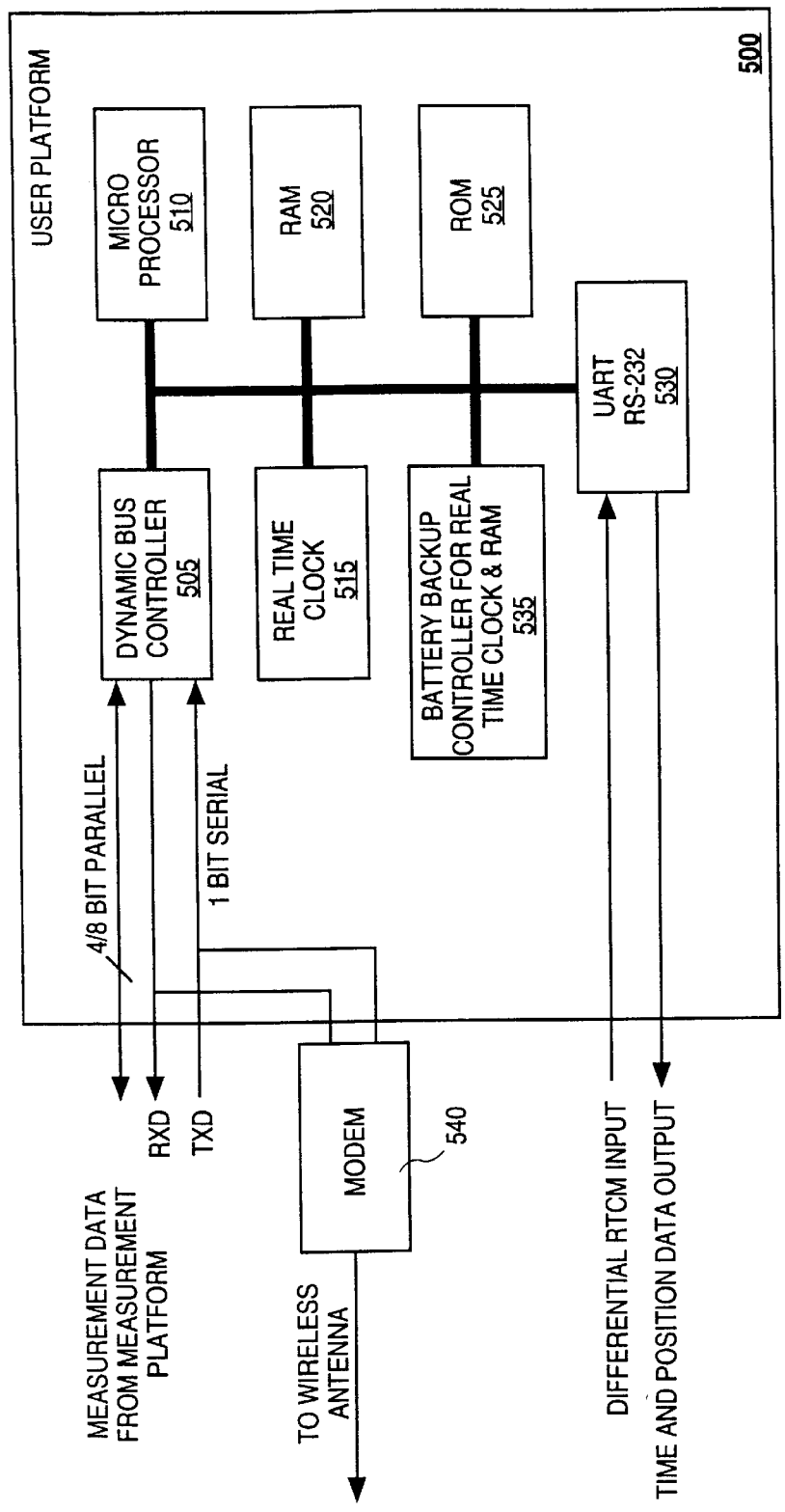
FIG. 5 is a block diagram of the user processing system in one embodiment of the present invention.

The embodiment of the user platform illustrated in FIG. 5 is exemplary; it is readily apparent that the user platform can be realized a variety of ways. For example, the user platform may be a desktop personal computer system or a single chip system. Alternately, the user platform may be distributed across multiple processors.

The invention has been described in conjunction with the preferred embodiment. It is evident that numerous alternatives, modifications, variations and uses will be apparent to those skilled in the art in light of the foregoing description.

What is claimed is:

1. A system for processing navigation information from positioning signals comprising:
   a measurement platform powered by a first power source comprising
      a positioning signal receiver comprising an antenna and downconverter configured to receive positioning signals and generate positioning data for multiple channels;
      a channel unit coupled to the positioning signal receiver and configured to receive in real time the positioning data for multiple channels, perform time critical intermediate positioning calculations at a time critical rate, generate intermediate positioning data and transmit the intermediate positioning data; and
   a user platform external to the measurement platform and powered by a second power source comprising
      a general purpose processing system bi-directionally communicatively coupled to the channel unit, the processing system receiving the intermediate positioning data from the channel unit of the measurement platform and calculating the position information from the intermediate positioning data, wherein the general purpose processing system is user programmable to execute applications utilizing the intermediate positioning data in a multitask environment concurrently together with other user applications.

2. The system as set forth in claim 1, wherein the channel unit further comprises a buffer for buffering the intermediate positioning data.

3. The system as set forth in claim 1, wherein the channel unit performs time critical intermediate positioning calculations in response to interrupts indicating that the positioning calculations are to be performed.

4. The system as set forth in claim 1, wherein the channel unit performs time critical intermediate positioning calculations on a real time basis.

5. The system as set forth in claim 1, wherein the general purpose processing system on the user platform further performs application processing using the intermediate positioning data provided.

6. The system as set forth in claim 1, further comprising a serial line coupled between the channel unit of the measurement platform and the general purpose processing system of the user platform to transmit intermediate positioning data and carry out other bi-directional communication.

7. The system as set forth in claim 1, further comprising a wireless connection between the channel unit of the measurement platform and the general purpose processing system of the user platform to transmit intermediate positioning data and carry out other bi-directional communication.

8. The system as set forth in claim 1, further comprising a connection formed by a plurality of parallel lines between the channel unit of the measurement platform and the general purpose processing system of the user platform for transmitting intermediate positioning data and carry out other bi-directional communication.

9. The system as set forth in claim 1, wherein the intermediate positioning data comprises code phase data.

10. The system as set forth in claim 1, wherein the intermediate positioning data comprises carrier phase data.

11. The system as set forth in claim 1, wherein the intermediate positioning data comprises Doppler data.

12. The system as set forth in claim 1, wherein the channel unit comprises a memory, said memory configured to store instructions executed by the channel unit.

13. The system as set forth in claim 12, wherein the channel unit of the measurement platform comprises a read only memory to store the instructions and a random access memory to temporarily buffer intermediate positioning data prior to output to the general purpose processing system of the user platform.

14. The system of claim 1, wherein the user platform transmits preposition data to the measurement platform, and wherein the preposition data contains information regarding a location at which the measurement platform may begin a search for a satellite.

15. The system of claim 1, wherein the user platform includes a real time clock, and wherein the real time clock is operable to provide an estimate of a current time for use in making a selection regarding which satellites may be visible to the measurement platform.

16. A measurement platform powered by a first power source comprising a channel unit configured to receive in real time from downconverter circuitry positioning data for multiple channels, the channel unit configured to perform time critical intermediate positioning calculations at a time critical rate and generate intermediate positioning data, the channel unit further configured to output the intermediate positioning data to a bi-directionally communicatively coupled processing device located on an external user platform powered by a second power source for subsequent calculations of position or time information from the received intermediate positioning data.

17. The measurement platform of claim 16, wherein the channel unit comprises a memory, said memory configured to store instructions executed by the channel unit.

18. The measurement platform of claim 17, wherein the channel unit comprises a read only memory to store the instructions and a random access memory to temporarily buffer intermediate positioning data prior to output to the external processing device.

19. The measurement platform of claim 16, wherein the channel unit further comprises a buffer configured to buffer the intermediate positioning data prior to output.

20. The measurement platform of claim 16, wherein, the channel unit further comprises a wireless port configured to output intermediate positioning data.

21. The measurement platform of claim 16, wherein the channel unit is configured to perform time critical intermediate positioning calculations on a real time basis.

22. The measurement platform of claim 16, wherein the channel unit further comprises a serial port configured to output the intermediate positioning data.

23. The measurement platform of claim 16, wherein, the channel unit further comprises a parallel port configured to output the intermediate positioning data.

24. A method comprising:
  receiving positioning signals transmitted;
  performing time critical calculations to track positioning signal transmitters at a time critical rate and generating intermediate positioning data used to determine a position of a receiver on a measurement platform powered by a first power source;
  transmitting the intermediate positioning data to an external user platform powered by a second power source; and
  the user platform computing the position of the receiver in a multitask environment together with other applications executing on the user platform.

25. The method as set forth in claim 24, further comprising buffering the intermediate positioning data prior to the transmitting.

26. The method as set forth in claim 24, further comprising the user platform performing applications processing using the computed position of the receiver.

27. The method as set forth in claim 24, wherein the performing time critical calculations generates code phase data.

28. The method as set forth in claim 24, wherein the performing time critical calculations generates carrier phase data.

29. The method as set forth in claim 24, wherein the performing time critical calculations generates Doppler data.

30. A computer readable medium comprising instructions which, when executed by a processor located on a user platform powered by a first power source, generate navigation solutions comprising:
  receiving intermediate positioning data from a coupled channel unit located on an external measurement platform powered by a second power source, the coupled channel unit being configured to receive in real time positioning data for multiple channels, perform time critical intermediate positioning calculations including acquisition and tracking at a time critical rate, generate intermediate positioning data, and transmit the intermediate positioning data to the processor on the user platform executing the instructions stored on the computer readable medium in a multitask environment together with other user applications; and
  calculating navigation solutions using the intermediate positioning data.

31. The computer readable medium as set forth in claim 30, wherein the navigation solution is selected from a group comprising position and time.

32. The method as set forth in claim 30, wherein the navigation solution is selected from a group comprising position and time.

33. The method as set forth in claim 30, further comprising buffering intermediate positioning data prior to the transmitting.

34. The method as set forth in claim 30, further comprising the user platform performing applications processing using the computed position of a receiver.

35. The method as set forth in claim 30, wherein performing time critical calculations generates data selected from a group comprising code phase data, carrier phase data and Doppler data.

36. A method comprising:
  receiving positioning signals from satellite positioning transmitters;
  bi-directionally communicatively coupling a measurement platform powered by a first power source to an external user platform powered by a second power source, wherein the measurement platform contains a first processor and the user platform contains a general purpose processor;
  performing calculations with the first processor to track the satellite positioning transmitters, wherein the calculations are performed at a time critical rate;
  generating intermediate positioning data from the calculations performed by the first processor;
  transmitting the intermediate positioning data from the measurement platform to the user platform;
  performing navigation calculations with the general purpose processor in a multitask environment together with the execution of other user applications.

37. The method of claim 36, wherein the intermediate data comprises code phase data, carrier phase data, or Doppler data.

38. The method of claim 37, wherein the intermediate data constitutes a snapshot of the code phase data, carrier phase data, or Doppler data.

39. The method of claim 37, wherein the intermediate data constitutes an average of the code phase data, carrier phase data, or Doppler data.

40. The method of claim 36, wherein the intermediate data is encrypted prior to transmission.

41. The method of claim 36, wherein the user platform transmits preposition data to the measurement platform, and wherein the preposition data contains information regarding a location at which the measurement platform may begin a search for a satellite.

42. The method of claim 36, wherein the user platform includes a real time clock, and wherein the real time clock is operable to provide an estimate of a current time for use in making a selection regarding which satellites may be visible to the measurement platform.

43. The method of claim 36, wherein the first processor is a dedicated processor that only performs functions related to positioning.

44. The method of claim 36, wherein the user platform comprises a personal computer.

45. The method of claim 36, wherein the navigation calculations are performed by a plurality of processors.

46. The method of claim 36, wherein the user platform has a different operating system than the measurement platform.

47. A positioning measurement platform comprising:
    a first power source to power the positioning measurement platform; circuitry to process positioning signals received from satellite transmitters; and a channel unit including a first processor, wherein the channel unit is operable to:
    receive the processed positioning signals;
    perform intermediate positioning calculations at a time critical rate,
    generate intermediate positioning data, and
    transmit the intermediate positioning data to a user platform powered by a second power source, wherein the user platform contains a general purpose processor to calculate navigation information using the intermediate positioning data in a multitask environment together with the execution of other user applications.

48. The positioning measurement platform of claim 47, wherein the intermediate positioning data comprises code phase data, carrier phase data, or Doppler data.

49. The positioning measurement platform of claim 48, wherein the intermediate positioning data constitutes a snapshot of the code phase data, carrier phase data, or Doppler data.

50. The positioning measurement platform of claim 48, wherein the intermediate data constitutes an average of the code phase data, carrier phase data, or Doppler data.

51. The positioning measurement platform of claim 47, wherein the intermediate positioning data is encrypted prior to transmission.

52. The positioning measurement platform of claim 47, wherein the user platform transmits preposition data to the positioning measurement platform, and wherein the preposition data contains information regarding a location at which the positioning measurement platform may begin a search for a satellite.

53. The positioning measurement platform of claim 47, wherein the user platform includes a real time clock, and wherein the real time clock is operable to provide an estimate of a current time for use in making a selection regarding which satellites may be visible to the positioning measurement platform.

54. The positioning measurement platform of claim 47, wherein the first processor is a dedicated processor that only performs functions related to positioning.

55. The positioning measurement platform of claim 47, wherein the user platform comprises a personal computer.

56. The positioning measurement platform of claim 47, wherein the navigation calculations are performed by a plurality of processors.

57. The positioning measurement platform of claim 47, wherein the user platform has a different operating system than the measurement platform.

58. A computer readable medium comprising instructions which, when executed by a processor located on a measurement platform powered by a first power source cause a channel unit to:
    receive in real time from downconverter circuitry positioning data for multiple channels;
    generate intermediate positioning data;
    output the intermediate positioning to a bi-directionally communicatively coupled processing device located on an external user platform powered by a second power source for subsequent calculations of at least one of position or time information from the received intermediate positioning data in a multitask environment together with the execution of other user applications.

* * * * *